US 8,041,002 B2

(12) United States Patent
Gatten et al.

(10) Patent No.: US 8,041,002 B2
(45) Date of Patent: Oct. 18, 2011

(54) METHODS, SYSTEMS, AND APPARATUSES FOR INCREASING EFFICIENCY IN COMPUTED TOMOGRAPHY DETECTION

(75) Inventors: Ronald Alan Gatten, Pleasanton, CA (US); Ugo DiGirolamo, Menlo Park, CA (US)

(73) Assignee: Morpho Detection, Inc., Newark, CA (US)

( * ) Notice: Subject to any disclaimer, the term of this patent is extended or adjusted under 35 U.S.C. 154(b) by 1073 days.

(21) Appl. No.: 11/848,593

(22) Filed: Aug. 31, 2007

(65) Prior Publication Data

US 2011/0002440 A1    Jan. 6, 2011

(51) Int. Cl.
*A61B 6/03* (2006.01)
(52) U.S. Cl. .............. 378/19; 378/20; 378/57; 378/207
(58) Field of Classification Search ............... 378/4, 19, 378/20, 207, 57
See application file for complete search history.

(56) References Cited

U.S. PATENT DOCUMENTS

| 5,229,934 | A | * | 7/1993 | Mattson et al. .............. 378/901 |
| 5,323,442 | A | | 6/1994 | Golovanivsky et al. |
| 5,461,656 | A | | 10/1995 | Golovanivsky et al. |
| 6,813,374 | B1 | | 11/2004 | Karimi et al. |
| 7,060,981 | B2 | | 6/2006 | Retterath et al. |
| 7,092,481 | B2 | | 8/2006 | Hoffman |
| 7,110,488 | B2 | | 9/2006 | Katcha et al. |
| 7,260,171 | B1 | | 8/2007 | Arenson et al. |
| 7,283,604 | B2 | | 10/2007 | DeMan et al. |
| 2006/0056579 | A1 | * | 3/2006 | Stierstorfer .............. 378/4 |
| 2006/0109956 | A1 | * | 5/2006 | Lacey ................. 378/199 |

* cited by examiner

*Primary Examiner* — Glen Kao
(74) *Attorney, Agent, or Firm* — Armstrong Teasdale LLP

(57) ABSTRACT

Methods, computer-readable mediums, and systems are provided. In one embodiment, a method detects at least one faulty X-ray detector signal and adjusts a conveyor speed and/or a gantry speed in accordance with the detection to increase information for image reconstruction. In another embodiment, a method detects a high volume time. Upon detection of the high volume time conveyor speed and gantry speed is increased during the high volume time. After expiration of the high volume time, the conveyor speed and gantry speed is reduced. In yet other embodiments, the computer-readable mediums and systems are also provided which perform similar features recited by the above methods.

8 Claims, 14 Drawing Sheets

METHODS, SYSTEMS, AND APPARATUSES FOR INCREASING EFFICIENCY IN COMPUTED TOMOGRAPHY DETECTION

GOVERNMENT RIGHTS IN THIS INVENTION

The U.S. Government has a paid-up license in this invention and the right in limited circumstances to require the patent owner to license others on reasonable terms as provided for by the terms of (Grant No. TSA-20-03-C-01900D089) awarded by the United States Department of Homeland Security.

BACKGROUND OF THE INVENTION

1. Field of the Invention

Embodiments of the present invention generally relate to X-ray detector scanning and more particularly, to methods, computer-readable mediums, and systems for increasing efficiency in computed tomography ("CT") scanning.

2. Description of the Related Art

In some known computed tomography ("CT") imaging system configurations, an X-ray source projects a fan-shaped or a cone-shaped beam, which is collimated to hit a linear or two dimensional array of detectors. The X-ray beam passes through an item being imaged. The beam, after being attenuated by the item, impinges upon an array of radiation detectors. The intensity of the attenuated radiation beam received at the detector array is dependent upon the attenuation of an X-ray beam by the item. Each detector element of the array produces a separate electrical signal that is a measurement of the beam intensity at the detector location. The intensity measurements from all the detectors are acquired separately to produce a transmission profile.

Sometimes information from a detector will not be received for conversion into a CT image (e.g., due to a bad detector or lack of transmission of an output signal derived from an output of the detector(s)). Typically, when a CT image is generated using information from less than the appropriate number of detectors the generated image does not have the desired resolution. In an effort to acquire proper resolution, the scanner is typically placed "out of service" until it is repaired (e.g., by replacing a detector(s) in the detector array or replacing the detector array); or an interpolation is performed which includes the bad detector. However, interpolation techniques are only an approximation ("a guesstimate") of what the information gathered by the bad detector should be and typically do not account for a significant difference between the bad detector and adjacent detectors used in the interpolation.

In addition, there are times when the X-ray scanner does not scan fast enough to keep up with scanning backlog. Increasing the scanning rate of the X-ray scanner can decrease the life of the scanner and its components. For example, when the rotational velocity of the gantry is increased there is an increase in load force placed on the gantry main bearing. This increased rotational loading causes additional load stress, which reduces bearing life in a disproportional manner. In addition, increasing the rotational rate of the gantry can also reduce the life of the charging capacitors.

When a scanner is out of service, a disruption in an ability to use the scanner creates delays and quite often a backlog of people waiting to utilize the scanner. In addition, increasing scanning rate in existing scanning systems diminishes the life of the scanner. Thus, there is a need to diminish scanning backlog and better utilize scanner resources.

BRIEF DESCRIPTION

These and other deficiencies of the prior art are addressed by embodiments of the present invention, which generally relates to X-ray scanning systems and more particularly, to methods, computer-readable mediums, and systems that increase computed tomography ("CT") scanning. In one embodiment, a method detects at least one faulty X-ray detector signal and adjusts a conveyor speed and/or a gantry speed in accordance with the detection to increase information for image reconstruction. In another embodiment, a method detects a high volume time. Upon detection of the high volume time conveyor speed and gantry speed is increased during the high volume time. After expiration of the high volume time, the conveyor speed and gantry speed is reduced.

Other embodiments are also provided in which computer-readable mediums and systems perform similar features recited by the above methods.

BRIEF DESCRIPTION OF THE DRAWINGS

So that the manner in which the above recited features of the present invention can be understood in detail, a more particular description of the invention, briefly summarized above, may be had by reference to exemplary non-limiting embodiments, some of which are illustrated in the appended drawings.

To facilitate understanding, identical reference numerals have been used, wherever possible, to designate identical elements that are common to the figures.

DETAILED DESCRIPTION

Figure 1:
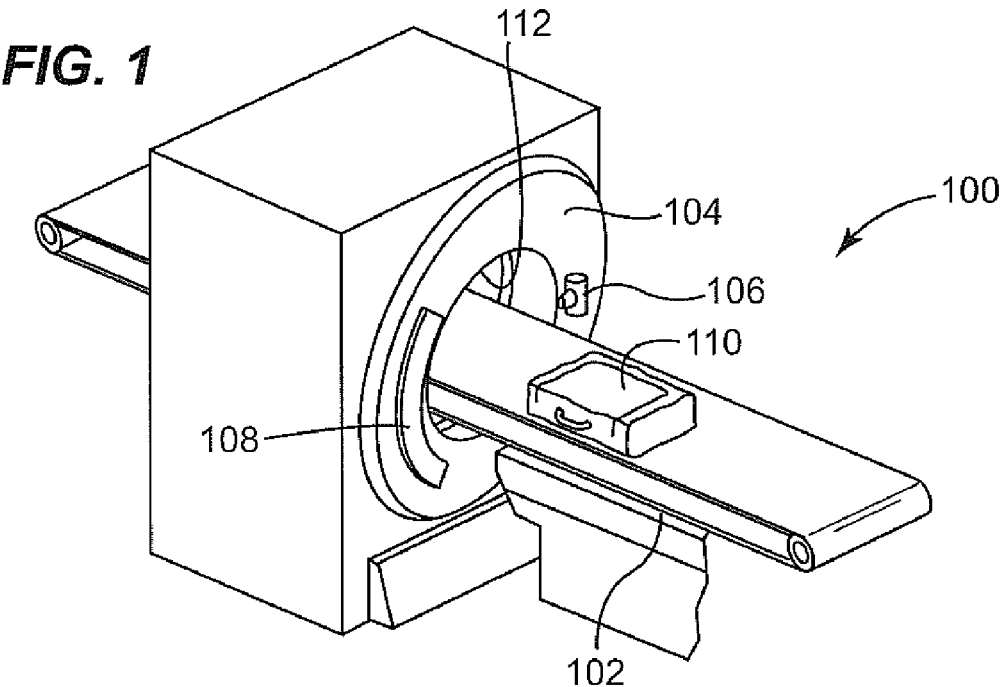
FIG. 1 is a perspective view of a gantry/conveyor combination in accordance with aspects of this disclosure.

In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of the appended claims.

There are times when the rate at which items need to be scanned is higher than usual (also known as "peak times"). Generally, as used herein, "peak times" are broadly defined as holidays, weekends, and/or any other time span flagged as a higher volume than normal time span. Peak times can be pre-stored in memory, flagged as peak times remotely, and/or flagged as peak times on "the fly" (e.g., by an X-ray scanner operator).

X-ray scanners occasionally fail to operate as desired. The failure can be due to any one of a number of reasons. For example, the failure can be due to a faulty detector(s) in the detector array (e.g., to properly receive and/or interpret radiation from the X-ray emitter); alternatively the failure can be due to a component not receiving an output signal (or a derivative signal of the output signal) from the detector(s). Generally, as used herein, a "detector failure" is broadly defined as an occurrence of either (or both) a failure of the detector(s) to properly receive and/or interpret radiation from the X-ray emitter; or a failure to receive the output signal (or the derivative the of the output signal) from the detector(s). Generally, as used herein, "pitch" is broadly defined as the ratio between the amount of motion of the detector array/X-ray emitter with respect to the conveyor (e.g., the conveyor motion with respect to the gantry) that happens during a full rotation of the gantry and the length of the detector in the direction of motion of the conveyor. Further, as generally used herein, a "bad" detector is broadly defined as any detector that malfunctions. A non-limiting example of a malfunction is a failure to receive information transmitted by the detector. In addition, "contraband," as used herein is broadly defined as any prohibited item(s) (e.g., explosives, explosive devices, weapons, items which can be used as weapons, flammable or combustible items, liquids, and/or items exceeding a predetermined size).

When less than the desired number of detectors in the detector array perform (i.e., at least one of the detectors fails), the detector array scans at less than the desired resolution. Such decrease of resolution may be limited to portions or parts of the acquired data. Scanning at less than the desired resolution often renders the resultant reconstructed image unusable for its intended purpose (e.g., identifying contraband, identifying medical abnormalities, and the like).

Further, a resultant reconstructed image from less than the requisite number of computed tomography ("CT") slices (i.e., resulting in a reconstructed image having a lower resolution than desired) can also render the resultant reconstructed image unusable for its intended purpose.

Some aspects of the invention include, but are not limited to, adjusting the speed of the conveyor; adjusting the speed of the gantry; and, adjusting the speed of the conveyor in combination with adjusting the speed of the gantry. Aspects of the invention are described herein as utilizing an X-ray emitter/detector array combination that rotates. However, it is appreciated that aspects of the invention can be used with scanners that have a stationary X-ray emitter and/or detector array.

One of the many benefits of this disclosure is a continued operation of the EDS machine even though one or more detector cells is not operating to specifications (as determined by on-board detector diagnostics). As a remediation to the problem of failed detector cells, the conveyor speed would be decreased and/or the gantry speed would be increased. This would result (in some embodiments) in the increased proximity (or density) of "spiral slices". Increasing the proximity of the slices in this way will (enabling better resolution) would be used in conjunction with detector signal averaging across the failed detector cell(s). For example the signal on each side of a bad detector signal (pixel) can be averaged (also reduces on-screen visual artifacts). The increased density of spiral scans due to slowing the conveyor means that there is less risk that the averaging of signals across adjacent detectors would result in missed detection of a thin sheet of explosive having a location relative to the conveyor and gantry might coincide precisely with the rotational trajectory of the failed detector cell.

As disclosed herein a reduction in conveyor speed of about 30% could enable sufficient improvement in the EDS system resolution to allow detector signals from detectors adjacent to the failed detector(s) to be averaged and substituted for that of a bad detector cell with minimal loss in the ability of the system to detect sheet explosives (sheet explosives being the detection case that is perhaps most difficult to mitigate in this situation). It is further appreciated that loss of multiple detector cell, as long as these cells are not in close proximity, can further be allowed in the same gantry. In various embodiments, the mapping of the locations of these failed detector cell locations can be part of a critical failure diagnostic routine.

When at least one detector fails, the resolution of the reconstructed image can be increased by increasing the amount of time that an item spends within the scanning area of the X-ray emitter/detector array (i.e., increasing the amount of time that an item is in the gantry). In various embodiments, slowing the speed of the conveyor can increase the amount of time that an item spends in the gantry. Special algorithms may be used to utilize correlate the speed of the gantry 104 with the speed of the conveyor 102 in such a way that there is very little or no loss of resolution when there is at least one bad detector.

In other embodiments, compensation for a failed detector (s) can be obtained by increasing the rotational speed of the gantry to increase the number of CT slices as the conveyor moves at its normal speed. In yet other embodiments, compensation for a failed detector(s) can be obtained by a combination of decreasing the speed of the conveyor and increasing the rotational speed of the gantry.

FIG. 1 is a perspective view of a gantry/conveyor combination 100. The gantry/conveyor combination 100 includes a conveyor 102 and gantry 104. The gantry 104 includes an emitter 106 (e.g., an X-ray emitter), a detector array 108, and a gantry tunnel 112. In operation, the conveyor 102 moves such that when an item (e.g., item 110) is placed on conveyor 102, the conveyor 102 moves the item towards; through; and past the gantry 104 and gantry tunnel 112.

The X-ray emitter 106 and the detector array 108 are rotated with the gantry 104 within the imaging plane and around the item(s) to be imaged such that the angle at which an X-ray beam intersects the item 110 constantly changes (hereinafter each change is referred to as "a view"). As the item 110 passes through the gantry 104, the gantry 104 gathers x-ray intensity data acquired from detectors in the detector array 108 for each view. Typically, each view is about 0.25 degrees apart from an immediately preceding view. Thus, for a full gantry rotation there can be about 1440 views.

Aspects of this disclosure correlate image resolution with the speed of the conveyor 102 and the rotational speed of the gantry 104. For example, in various embodiments, when a detector(s) in the detector array 108 is bad, the speed of conveyor 102 is decreased and/or the speed of the gantry 104 can be increased. When at least one detector is bad, increasing image resolution compensates for the bad detector(s).

For example in one embodiment, when it is determined that at least one detector is bad (explained in greater detail below) the speed of conveyor 102 is decreased (e.g., decreased below speed "x") while the speed of the gantry 104 remains at a normal operating speed (e.g., about 120 R.P.M.s). Because an item moves slower (due to the reduced conveyor speed) the gantry 104 has more time to rotate around the item and gather more data on the item.

In other embodiments, when at least one bad detector is detected, the speed of the gantry 104 is increased above its normal rotational speed (e.g., from a range of about 121 R.P.M.s up to about 150 R.P.M.s and higher) while the speed of the conveyor 102 is maintained at the exemplary speed "x." Due to the increased rotational speed of the gantry 104, the gantry 104 acquires more data for the item and does so at a faster rate. Because more data is acquired, the reconstructed image will have a higher resolution to compensate for the lack of information due to the bad detector(s).

In yet other embodiments, when at least one bad detector is detected, the speed of the conveyor 102 is decreased and the rotational speed of the gantry 104 is increased. By decreasing the speed of the conveyor 102 and increasing the rotational speed of the gantry 104, neither the decreased conveyor speed nor the increased gantry speed have to be as large as in the previously described embodiments.

In still other embodiments, all of the detectors are functioning within parameters. In these embodiments, when a time span is flagged as a "high use" time (e.g., during a high travel time such as weekends or holidays) or there is a backlog of items to be scanned, the rotational speed of the gantry 104 is increased (e.g., up to about 150 R.P.M.s) and the speed of the conveyor 102 is increased. Increasing the rotational speed of the gantry 104 increases the rate at which information is acquired. However, because all of the detectors are functioning within parameters an increase in image resolution is not necessarily required. As such, the speed of the conveyor 102 can be increased because of the increased gantry 104 rotational speed.

Figure 2:
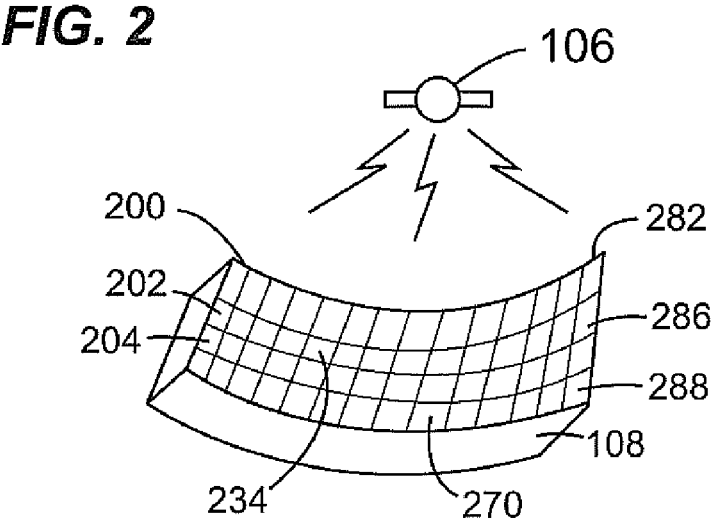
FIG. 2 depicts a perspective view of an emitter and detector array combination in accordance with aspects of this disclosure.

FIG. 2 depicts a perspective view of an embodiment of the emitter 106 and detector array 108. The emitter 106 emits X-rays that the detector array 108 is designed to detect. The emitter 106 and detector array 108 combination is known and will not be discussed in detail. The detector array 108 has a plurality of detectors (e.g., thousands of detectors). For simplicity, the detector array 108 is described utilizing a few of the detectors (i.e., detectors 200, 202, 204, 234, 270, 282, 286, and 288) in the detector array 108.

Figure 3:
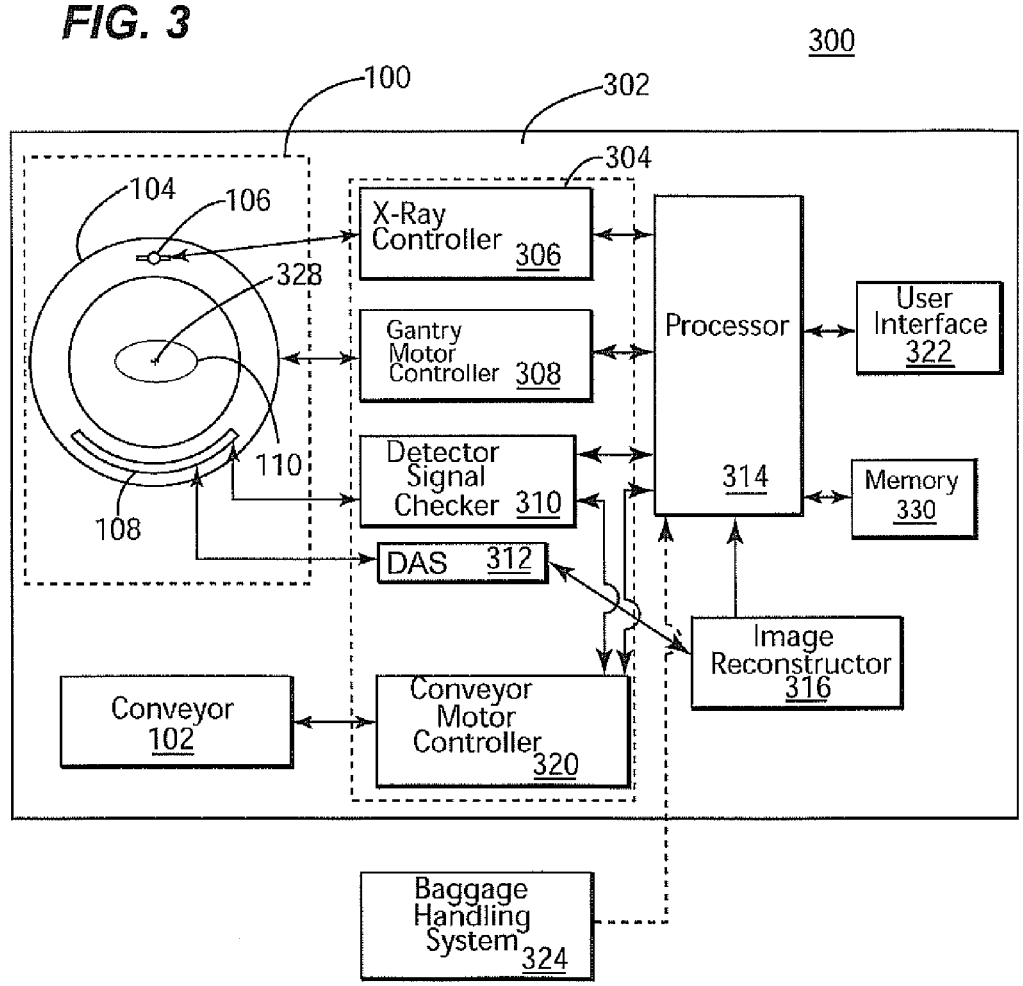
FIG. 3 depicts an embodiment of a block diagram used in accordance with aspects of this disclosure.

FIG. 3 depicts an embodiment of a block diagram of a system 300 used in accordance with aspects of this disclosure. System 300 includes the gantry/conveyor combination 100, a control mechanism 304, a processor 314, a user interface 322, memory 330, an image reconstruction subsystem 316, a conveyor motor controller subsystem 320, the conveyor 102, and a baggage handling system 324.

The gantry/conveyor combination 100 includes the gantry 104, the emitter 106, and the detector array 108. Each detector (e.g., detectors 200, 202, 204, 234, 270, 282, 286, and 288) in the detector array 108 produces an electrical signal that represents the intensity of an impinging X-ray beam and hence allows estimation of the attenuation of the beam as it passes through item 110. During a scan to acquire X-ray projection data, gantry 104 and the components mounted thereon rotate about a center of rotation 328.

Rotation of gantry 104, the operation of X-ray emitter 106, movement (e.g., speed control) of the conveyor 102, and a determination of detector failure are governed by the control mechanism 304. The control mechanism 304 includes an X-ray controller 306 that provides power to X-ray source 106, a gantry motor controller 308 that controls the rotational speed and position of gantry 104, a conveyor motor controller 320, a detector signal checker 310 to check for detector failure, and a data acquisition system ("DAS") 312. The detector signal checker 310 operates as described below and depicted in subsequent figures.

The DAS 312 samples analog data from detector array 108 and converts the data to digital signals for subsequent processing. An image reconstructor 316 receives sampled and digitized X-ray data from DAS 312 and performs high-speed image reconstruction. The reconstructed image is applied as an input to the processor 314, which stores the image in memory 330.

Processor 314 may also receive commands and scanning parameters from an operator (not shown) via the user interface 322 (e.g., a cathode ray tube, a keyboard, a mouse, and/or like device).

The operator can supply commands and parameters via the user interface 322 to instruct the processor 314 to provide control signals and information to the DAS 312, the X-ray controller 306, the gantry motor controller 308, the conveyor motor controller 320, and the detector signal checker 310.

Figure 4:
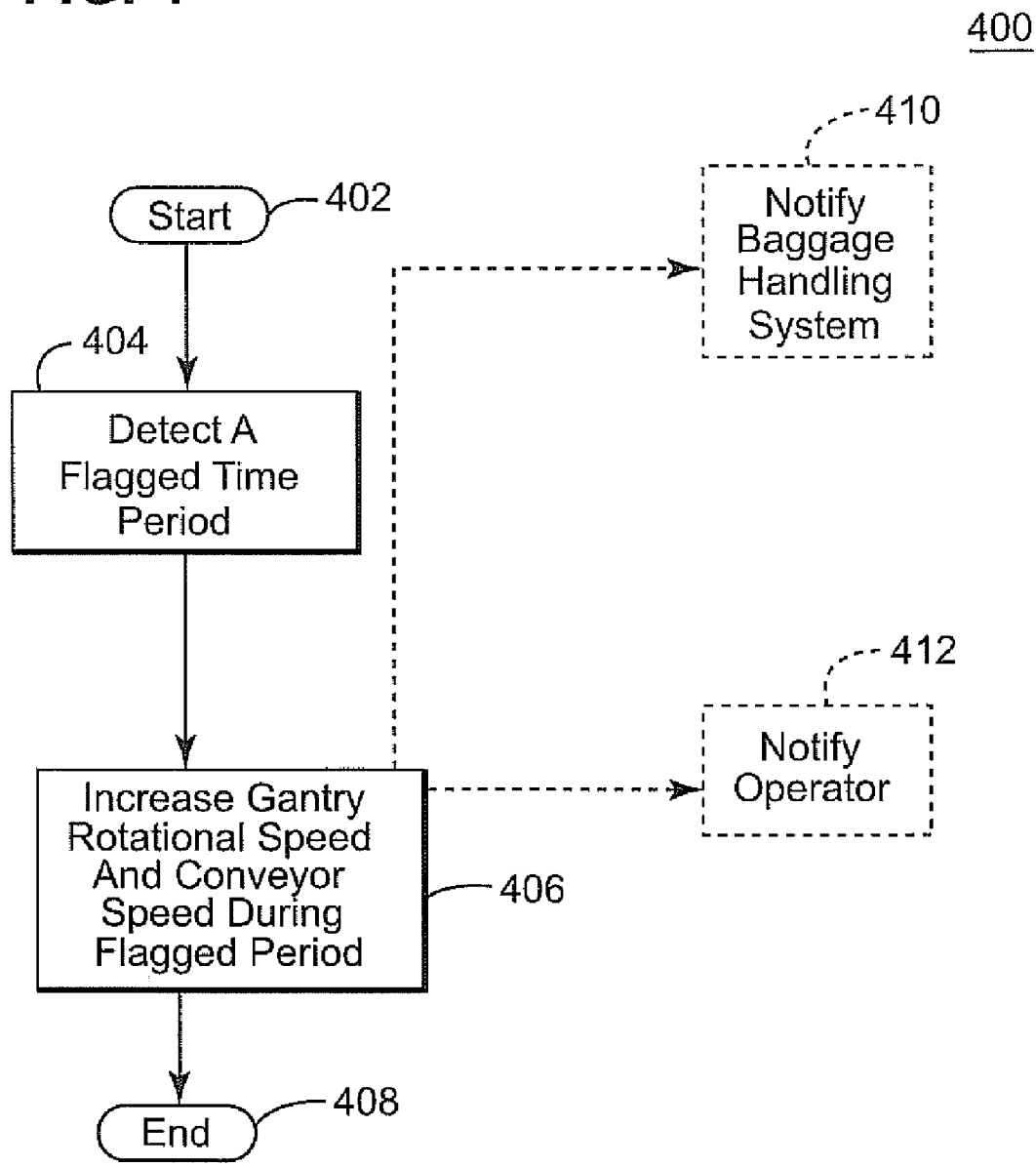
FIG. 4 depicts an embodiment of an exemplary first method used in accordance with aspects of this disclosure.

FIG. 4 depicts a high-level block diagram of an embodiment of a method 400 used in accordance with aspects of this disclosure. The method 400 begins at step 402 and proceeds to step 404.

At step 404, the method 400 detects a flagged time period. This flagged period can be time spans which include, but are not limited to, holidays; weekends; times annotated by history as high traffic times; and/or times when items need to be scanned faster. When a flagged time period is detected, the method 400 proceeds to step 406.

At step 406, the rotational speed of the gantry 104 is increased. For example, the gantry speed can be increased above 120 R.P.M.s (e.g., a range of about 121 R.P.M.s to about 150 R.P.M.s in various embodiments and higher than 150 R.P.M.s in other embodiments). Because there is an increase in the rotational rate of the gantry 104, information regarding the various views is acquired at a faster rate. Because information needed to reconstruct an image is acquired at the faster rate the speed of the conveyor 102 can also be increased. For example, when a significant number of detectors (e.g., all or almost all of the detectors) is functioning properly, the gantry 104 can be increased to about 150 R.P.M.s and the speed of the conveyor 102 can likewise be increased. The speed of the gantry 104 and conveyor 102 is increased during the flagged time period. By increasing the speed of the gantry 104 and conveyor 102 during the flagged time(s) wear and tear on the system 100 is lower than if the gantry 104 and conveyor 102 were always run higher speeds (e.g., at speeds higher than 120 R.P.M.s). After the expiration of the flagged time period, the speed of the gantry 104 and conveyor 102 is reduced (e.g., to the same values prior to the occurrence of the flagged time period). In addition, after the expiration of the flagged time period, the method proceeds to and ends at step 408.

Method 400 also includes optional steps 410 and 412 (depicted using dashed lines). At step 406, the method 400 optionally proceeds towards step 410 and/or step 412. At optional step 410, the baggage handling system 324 is notified of the increase in gantry speed and conveyor speed. At optional step 412, the operator of system 100 is notified of the increase in gantry speed and conveyor speed.

Although optional steps 410 and 412 are depicted as occurring after step 406, in other embodiments optional steps 410 and 412 can occur after step 404 (i.e., prior to step 406).

Figure 5:
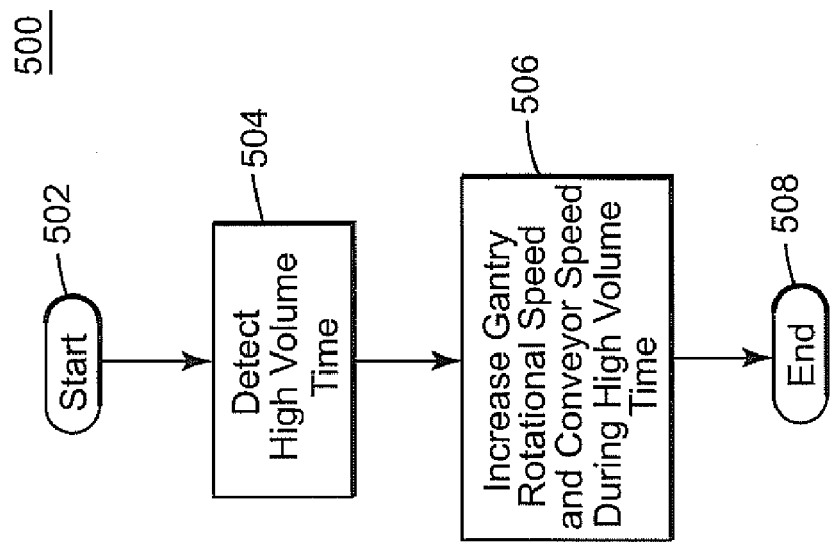
FIG. 5 depicts an embodiment of an exemplary second method used in accordance with aspects of this disclosure.

FIG. 5 depicts an embodiment of a method 500 used in accordance with aspects of this disclosure. The method 500 begins at step 502 and proceeds to step 504.

At step 504, high volume is detected. An operator of system 100 can detect the high volume. High volume detection by the user allows greater control over the system 100. For example, when high volume is detected, the method 500 proceeds to step 506.

At step 506, the user, in response to the high volume detection, initiates a control signal that causes the speed of gantry 104 and conveyor 102 to increase. When the high volume is no longer present, the user can initiate a control signal that causes a reduction in the speed of the gantry 104 and conveyor 102. Thereafter, the method proceeds to and ends at step 508.

Figure 6:
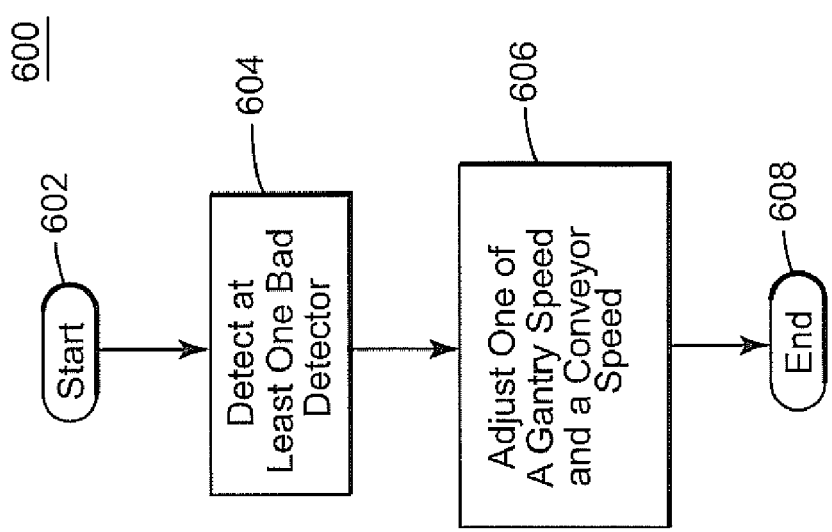
FIG. 6 depicts an embodiment of an exemplary third method used in accordance with aspects of this disclosure.

FIG. 6 depicts an embodiment of a method 600 used in accordance with aspects of this disclosure. The method 600 begins at step 602 and proceeds to step 604.

At step 604, the method 600 detects at least one bad detector. As explained above, detector is labeled a bad detector if information received from the detector is not within the desired operating parameters. Exemplary bad detector detection methods are presented below. After detection of at least one bad detector, the method 600 proceeds to step 606.

At step 606, the method compensates for a lack of resolution due to the bad detector(s). The compensation can be by increasing the rotational speed of gantry 104 and/or decreasing the speed of conveyor 102. Thereafter, the method proceeds to and ends at step 608.

Figure 7:
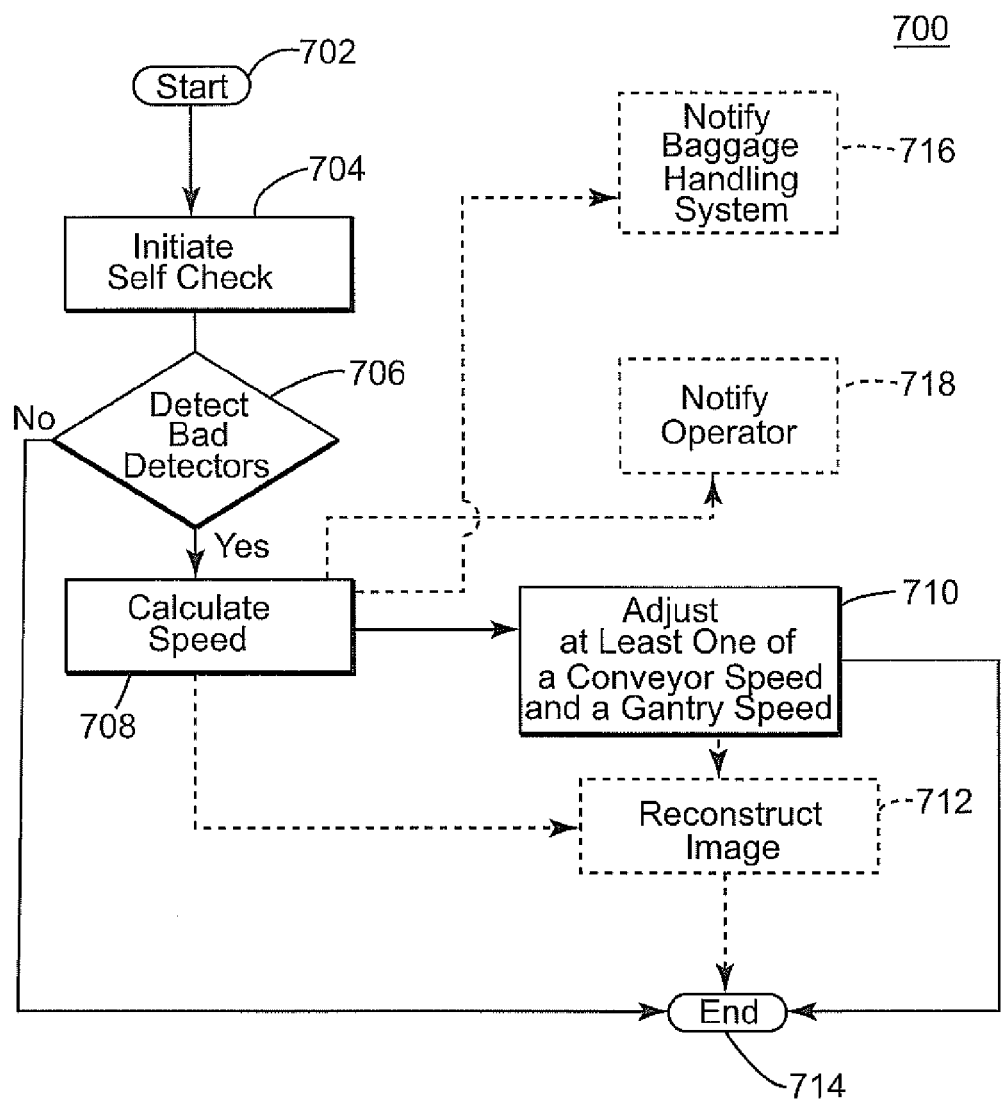
FIG. 7 depicts an embodiment of an exemplary fourth method used in accordance with aspects of this disclosure.

FIG. 7 depicts an embodiment of a method 700 used in accordance with aspects of the invention. The order of the steps depicted in FIG. 7 (and described below) is illustrative only. As such, the steps of method 700 may be reformed in any suitable order or simultaneously, in accordance the invention. Simultaneously, referring to FIGS. 1, 2, 3, and 7, the method 700 begins at step 702 and proceeds to step 704.

At step 704, the method 700 initiates a self-check. In various embodiments, the self-check 704 can be an automated diagnostic tool (e.g., detector signal checker 310 implemented in hardware and/or software) that periodically tests for reception and/or integrity of signals received from detectors (e.g., detectors 200, 202, 204, 234, 270, 282, 286, and/or 288) in the detector array 108. For example, in various embodiments, after a preset number of scans or after an expiration of a predetermined time, the scanning system 302 initiates the self-check 704.

In other embodiments, the self-check 704 is initiated when the system 100 is initially turned on. In yet other embodiments, a user can initiate the self-check 704 via user interface 322 and/or remotely via baggage handling system 324.

After step 704, the method 700 proceeds to step 706. At step 706, the method 700 determines whether detectors (e.g., detectors 200, 202, 204, 234, 270, 282, 286, and/or 288) are bad (i.e., whether information is received from the detectors). The results of the determination can be transmitted to processor 314. If, at step 706 an affirmative determination is made (i.e., that there are bad detectors) each bad detector and its position in the detector array 108 is stored in memory (e.g., memory 330). Thereafter, the method 700 proceeds to step 708.

If, however a negative determination is made (i.e., that information is properly received from the detectors (e.g., that none of the detectors are faulty)) the method proceeds to and ends at step 714.

As indicated earlier, if an affirmative determination is made at step 706, the method 700 proceeds to step 708. To increase the amount of information gathered by the detector array 108, the amount of time that an item (e.g., item 110 and/or item 112) is in the gantry is increased. This is can be accomplished by slowing the speed of the conveyor 102 and/or increasing the rotational speed of gantry 104. The method 700 determines, based in part upon the number and location of the faulty/malfunctioning detector(s), a proper speed for the conveyor 102 and/or rotational speed for the gantry 104 to obtain a desired image resolution. The calculation can determine either the proper speed or an amount to adjust the current speed of the conveyor 102 and or gantry 104.

The method 700 can use the results of the calculation(s) performed at step 708 in various ways. For example, in various embodiments, the results of the calculations performed at step 708 are transmitted towards optional steps 716 to notify the baggage handling system (which can also include notification that the scanning system 300 needs maintenance), 718 to notify the operator of system 100 (which can also include notification that the scanning system 300 needs maintenance), and/or 712 to assist in reconstruction of the image. After step 708, the method proceeds towards step 710.

At step 710, the calculation in step 708 is used adjust the speed of the conveyor 102 and/or the gantry 104. The conveyor speed adjustment and/or gantry speed adjustment can be made in a number of ways. For example, in various embodiments, knowledge of the prior speed of the conveyor 102 and/or gantry 104 can be used when the step 708 calculates the amount to adjust the speed of the conveyor 102 and/or gantry 104. Prior knowledge of the speed of the conveyor 102 and/or the speed of the gantry 104 can be obtained from memory 330. In addition, prior knowledge of the speed of the conveyor 102 and/or gantry 104 can be obtained in real-time from the conveyor control system 304, gantry motor controller 308, or other speed monitoring apparatus, that monitors the speed of the conveyor 102 and gantry 104. In other embodiments, when the calculation is the proper speed of the conveyor 102 and/or gantry 104, adjustments are made without determining the difference between the current speed (of the conveyor 102 and/or gantry 104) and the desired speed (of the conveyor 102 and/or gantry 104).

In one embodiment, after the speed of the conveyor 102 and/or gantry 104 is adjusted in step 710, the method 700 proceeds to and ends at step 714.

In other embodiments, after step 710 the method 700 proceeds to optional step 712. At step 712, an item is scanned, (using the adjusted conveyor speed and/or gantry speed) and reconstructed using scanning system 300. Thereafter, the method 700 proceeds to and ends at step 714.

Figure 8:
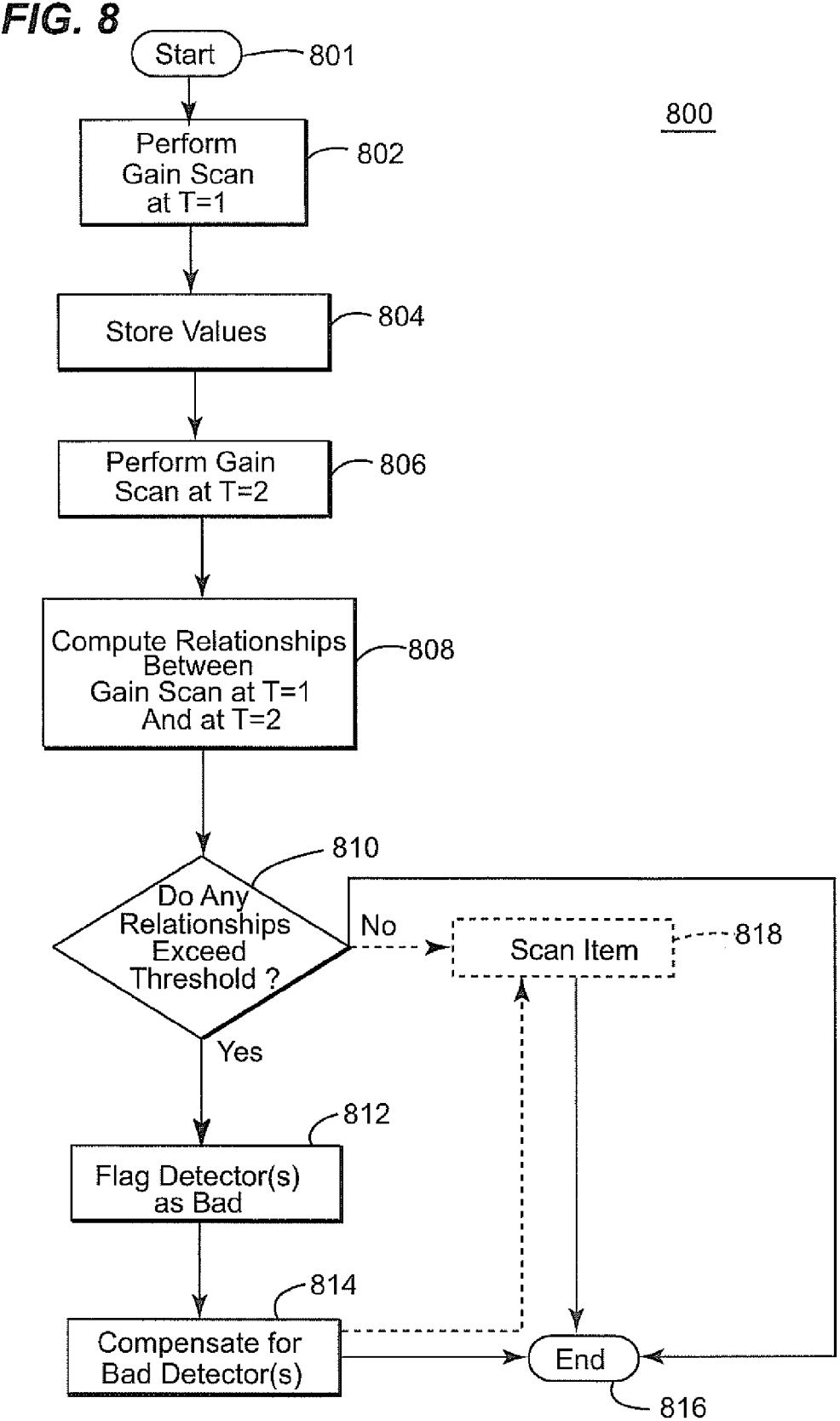
FIG. 8 depicts an embodiment of an exemplary fifth method used in accordance with aspects of this disclosure.

FIG. 8 depicts an exemplary method 800 for detecting at least one detector in accordance with aspects of this disclosure. The method 800 begins at step 801 and proceeds to step 802.

At step 802, the method calibrates the detectors in detector array 108 to acquire values for each detector in detector array 108. Calibration includes scanning the air (i.e., scanning with nothing on the conveyor 102) and using the acquired values in subsequent calculations. It is presumed that for the values acquired at step 802 that the detectors are functioning within desired operating parameters. After scanning, the method proceeds to step 804.

At step 804, the calibration values are stored in memory (e.g., memory 330) for subsequent use. After certain condition(s), the method 800 proceeds to step 806. Some exemplary conditions, which would cause the method 800 to proceed to step 806, include, but are not limited to, an initial start-up (i.e., "turning on") of system 100, an expiration of a predetermined time, and/or a user request to proceed to step 806.

At step 806, the system 100 rescans for air (i.e., scans without anything on the conveyor 102) to acquire values for each of the detectors in detector array 108. In various embodiments, the values acquired during rescanning may also be stored in memory (e.g., memory 330). Thereafter, the method 800 proceeds to step 808.

At step 808, relationships are computed for each of the detectors in detector array 108 using the values acquired at step 802 and step 806. For example, in various embodiments, the relationships formed by (for each detector) dividing the value acquired in step 802 by the value acquired in step 806. After relationships are computed for all of the detectors in detector array 108, the method 800 proceeds to step 810.

At step 810, the method 800 queries whether any of the relationships exceeds a predetermined threshold. The threshold can be predetermined in a number of ways. For example, the threshold can be predetermined in accordance with resolution requirements and/or the application(s) (e.g., medical imaging or security). For example, (in various embodiments) in medical imaging a threshold deviation of about 1% is sufficient and for security scanning a threshold deviation of about 10% is sufficient. In yet other embodiments, the desired threshold deviation is dependent upon different locations in the gantry and/or detector array. If the query is answered negatively, the method proceeds to step 818. At step 818, the system 100 enters a normal operation mode and is ready to scan items. Thereafter, the method proceeds to and ends at step 816.

If however, an affirmative determination is made at step 810 the method 800 precedes to step 812. At step 812 each detector having a relationship that exceeds the threshold is flagged as a bad detector. The location of the bad detector(s) is stored in memory (e.g., memory 330). After all of the bad detectors are flagged, the method 800 proceeds to step 814.

Figure 9:
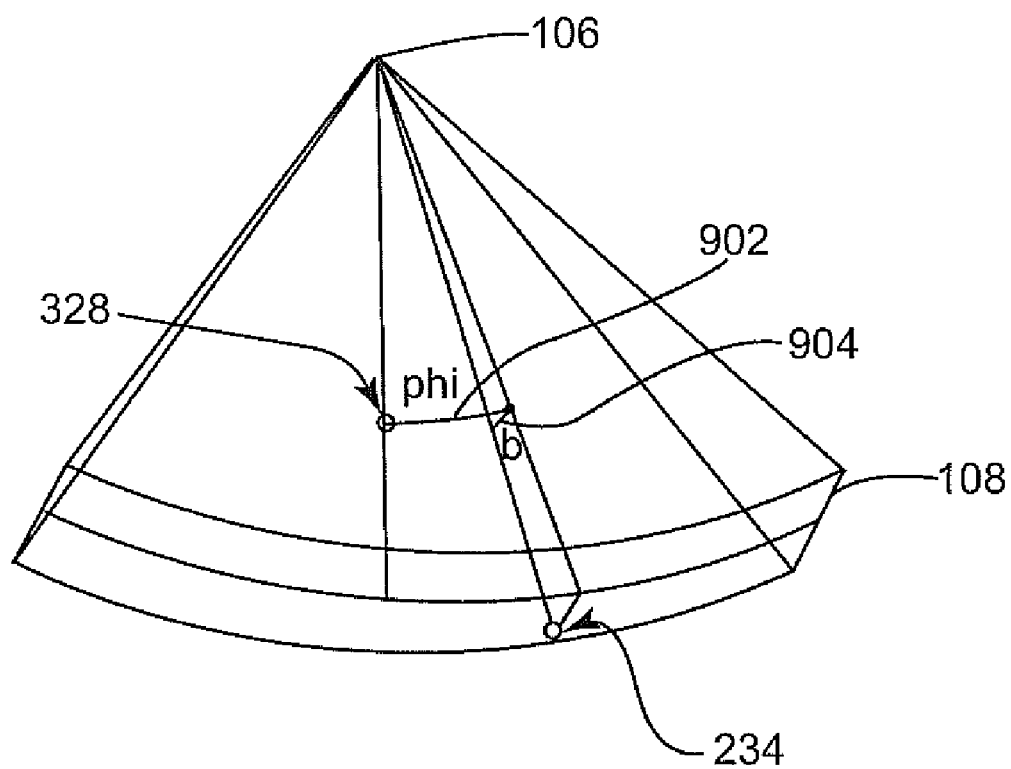
FIG. 9 depicts an embodiment of an area of influence of an exemplary emitter on an exemplary detector array in accordance with aspects of this disclosure.
Figure 10:
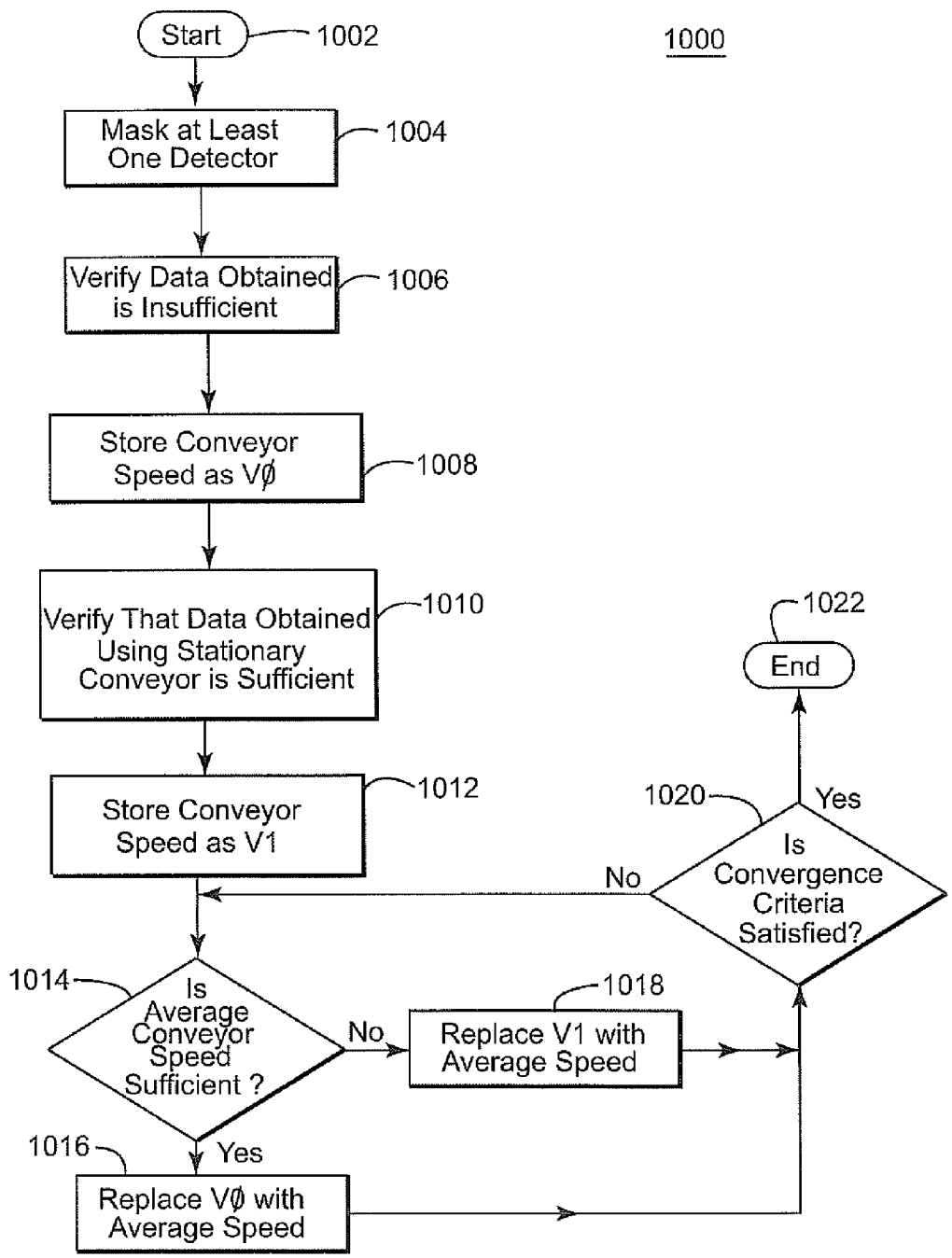
FIG. 10 depicts an embodiment of an exemplary sixth method used in accordance with aspects of this disclosure.

At step 814, the method compensates for the bad detectors in the detector array 108. Because at least one detector is bad, there may be a loss of resolution in a reconstructed image. To compensate for the bad detector image resolution is increased. For example, in various embodiments, image resolution is increased by at least one of: decreasing the speed of the conveyor 102 to a predetermined speed; increasing the rotational speed of the gantry 104; or a combination of increasing the speed of the gantry 104 and decreasing the speed of the conveyor 102. Described below using FIGS. 9 and 10 is an exemplary method for correlating an acceptable conveyor speed with the bad detector(s). After compensation the method proceeds to step 818. At step 818, the system 100 enters a normal operation mode and is ready to scan items. Thereafter, the method proceeds to and ends at step 816.

In various embodiments, reducing the conveyor speed by a pre-determined factor (e.g., by about 25%) and/or increasing the gantry rotational speed by a pre-determined factor (e.g., increasing the gantry speed above 120 R.P.M.s) compensates for bad detectors.

Different algorithms may be used to correlate the speed of the conveyor 102 and/or speed of the gantry 104 with the number and location of the bad detector(s).

FIG. 9 depicts an embodiment of an area of influence 900 of an emitter (illustratively depicted as emitter 106) on a detector array (illustratively depicted as detector array 108). FIG. 9 depicts a positional relationship between emitter 106, the center of rotation 328, and detector 234 in detector array 108. For illustrative purposes, the area of influence 900 is depicted as having a "fan shape." However, it is appreciated that the area of influence can have other shapes (e.g., a cone shape). Within the area of influence 900 are the center of rotation 328 and detector array 108. For exemplary purposes, only one detector (i.e., detector 234) is depicted in detector array 108.

In FIG. 9 a distance "b" (see also lead-line 904) from a plane of rotation of the center of rotation 328, as projected on an equivalent cylindrical detector 234 centered in the area of influence 900 of the emitter 106 and passing through the center of rotation 328 of the gantry 104.

FIG. 9 also depicts an angle $\phi$, which is an angle between the center of rotation 328, and a projection of the detector 234 on a plane of rotation of the center of rotation 328 and a central ray.

Using the relationship shown in FIG. 9 a formula can be created to determine, for each bad detector (e.g., detector 234), a class of corresponding could be used to supplement the information missing from bad detector 234. A standard cylindrical detector is composed by detectors having:

$$-b_{max} < b < b_{max} \text{ and } -\phi_{max} < \phi < \phi_{max} \qquad \text{Equation (1)}$$

where "b" and "$\phi$" have already been defined above, $b_{max}$ is the length of the detector in the direction of detector motion, $-b_{max}$ is the length of the detector in a direction of motion opposite to the direction of motion for $b_{max}$, $\phi_{max}$ is the length of a bend in the detector array 108 in one direction, and $-\phi_{max}$ is the length of the in bend in the detector array 108 in a direction opposite to the direction of $\phi_{max}$.

With an understanding of Equation (1) other formulas can be derived to determine whether a given conveyor speed and/or gantry speed provides enough information (i.e., for reconstruction of an image having adequate resolution) to supplement missing information due to bad detectors. For example, one such equation is presented immediately below which produces all the possible corresponding detectors for a detector shown at coordinates ($\phi$, b) (illustratively detector 234):

$$(\phi_{equiv}, b_{equiv}) = (-\phi, b + K^*((2n-1)\pi - 2\phi)/\cos(\phi)) \qquad \text{Equation (2)}$$

where "b" "$\phi$" have already been described above, K is the distance traveled by the conveyor 102 during one rotation of the gantry 104, and n is the number of rotations of the gantry 104. Values that comply with Equation (1) are acceptable.

Computer software which utilizes Equation (1) and Equation (2) can be used to determine a conveyor speed and/or gantry speed for which very little (or no) information is missing given the detector(s) that are currently bad.

In addition, software simulations can be performed to determine which conveyor speed provides sufficient information for reconstruction of an image having adequate resolution. For example, FIG. 10 depicts a method 1000 which can be performed as a software simulation to predetermine geometric ratio (i.e., relative speed) between the conveyor 102 and gantry 104 in accordance with aspects of this disclosure. The method begins at step 1002 and proceeds to step 1004. One way to simulate detector failure is to mask the detector so that information will not be received from the detector. At step 1004, at least one detector in the detector array 108 is masked. After detector masking, the method 1000 proceeds to step 1006.

At step 1006, the method 1000 simulates an air scan while the conveyor 102 is moving. The method 1000 analyzes the data obtained under these conditions. At step 1006, verifies that at the present conveyor speed and gantry speed the data obtained is insufficient to reconstruct an image having the necessary resolution. Thereafter, the method 1000 proceeds to step 1008.

At step 1008, the method 1000 annotates the conveyor speed (used in step 1008) as $V_0$ and stores $V_0$ in memory. After step 1008, the method 1000 proceeds to step 1010.

At step 1010, the simulated conveyor speed is reduced to 0. An air scan is performed and the data is analyzed for verification that the data obtained is adequate to reconstruct the image with the necessary resolution. After verification, the method 1000 proceeds to step 1012.

At step 1012 the conveyor speed used at 1010 is annotated at $V_1$. Thereafter, the method 1000 proceeds to step 1014.

At step 1014, an average of V0 and V1 is calculated and annotated as the average speed of the conveyor 102. The method 1000 simulates scanning as if the conveyor 102 were running at the average speed. The method 1000 then determines whether the data acquired under these circumstances is adequate to reconstruct an image having adequate resolution. If the method 1000 determines that the data acquired is adequate, the method 1000 proceeds to step 1016.

At step 1016, the value stored as $V_0$ is replaced with the average speed. Thereafter, the method 1000 proceeds to step 1020.

At step 1020 the 1000 queries whether $V_0$ and $V_1$ have sufficiently converged (i.e., the difference between $V_0$ and $V_1$ is sufficiently small). If answered affirmatively, the method 1000 proceeds to and ends at step 222. If however, the query is answered negatively, the method proceeds to step 1014.

If, at step 1014 the query is answered negatively, the method 1000 proceeds to step 1018.

At step 1018, the value stored as $V_1$ is replaced with the average speed. Thereafter the method 1000 proceeds to step 1020.

Please note method 1000 correlates the gantry speed to the conveyor speed. As such, it is appreciated that in various embodiments of method 1000, the gantry speed can be increased (e.g., from 120 R.P.M.s to some higher speed) and the steps performed in method 1000 (i.e., steps 1002 through 1020) are performed at the higher gantry speed.

Figure 11:
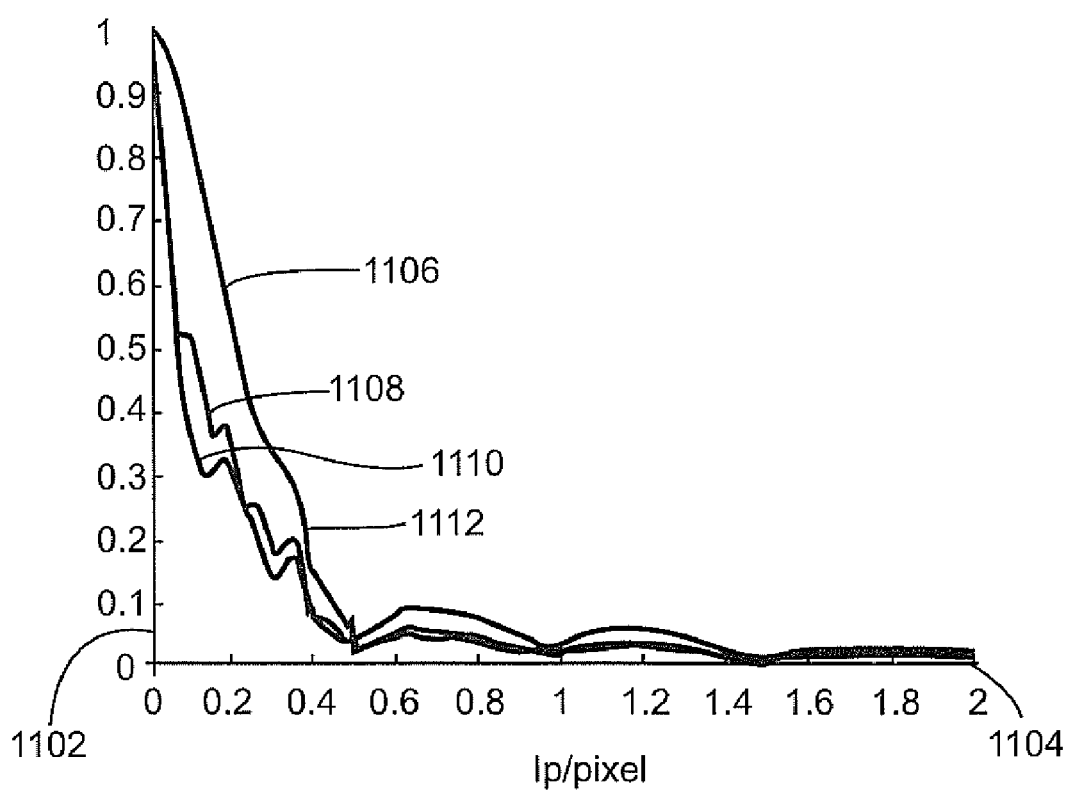
FIG. 11 depicts an exemplary first graph of aspects of the invention.

FIG. 11 depicts an exemplary graph 1100 in accordance with aspects of this disclosure. The graph 1100 contains data lines demonstrating four conditions. The conditions are as follows: a pitch of 1.5000 and no bad detectors (referred to hereinafter as "condition 1106"); a pitch of 1.5000 with bad detectors and naïve correction is used to compensate for the bad detectors (referred to hereinafter as "condition 1108"); a pitch of 0.7500 with bad detectors and naïve correction is used to compensate for the bad detectors (referred to hereinafter as "condition 1110"); and a pitch of 0.7500 with bad detectors and advanced correction is used to compensate for the bad detectors (referred to hereinafter as "condition 1112"). "Naïve" correction, as used herein, indicates the use of approximation techniques to determine the information contained in a bad detector(s).

Cross-sectional image slices for conditions 1106, 1108, 1110, and 1112 are depicted in FIGS. 14-17, respectively. Note that FIGS. 14-17 are depicted as having a resolution of 1024×1024. However, that resolution is for illustrative purposes only and not intended in any way to limit the scope of the invention.

Figure 14:
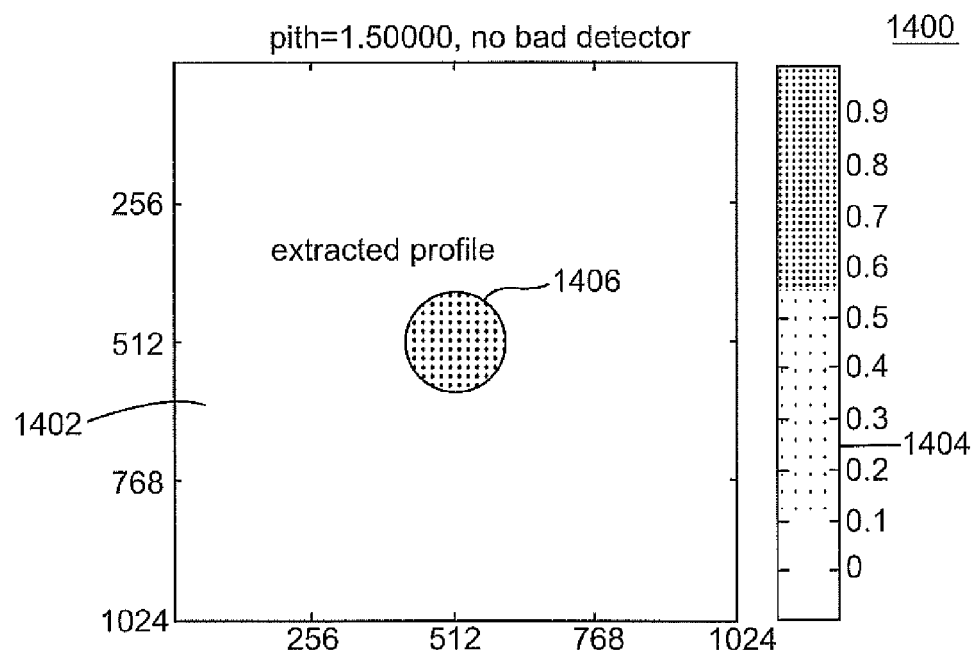
FIG. 14 depicts an exemplary computed tomography ("CT") image slice at a 1.5000 pitch utilizing signals from all detectors.

FIG. 14 depicts an image 1400 scanned under condition 1106 (i.e., having a pitch of 1.5000 and no bad sectors). The image 1400 contains an extracted profile 1406 viewed at the illustrative resolution 1402 of 1024×1024. Image 1400 also includes contrast chart 1404 that shows, within an arbitrary scale factor, the numeric meaning of the different shades of grey, which is proportional to the X-ray absorption properties of the material being imaged.

Figure 15:
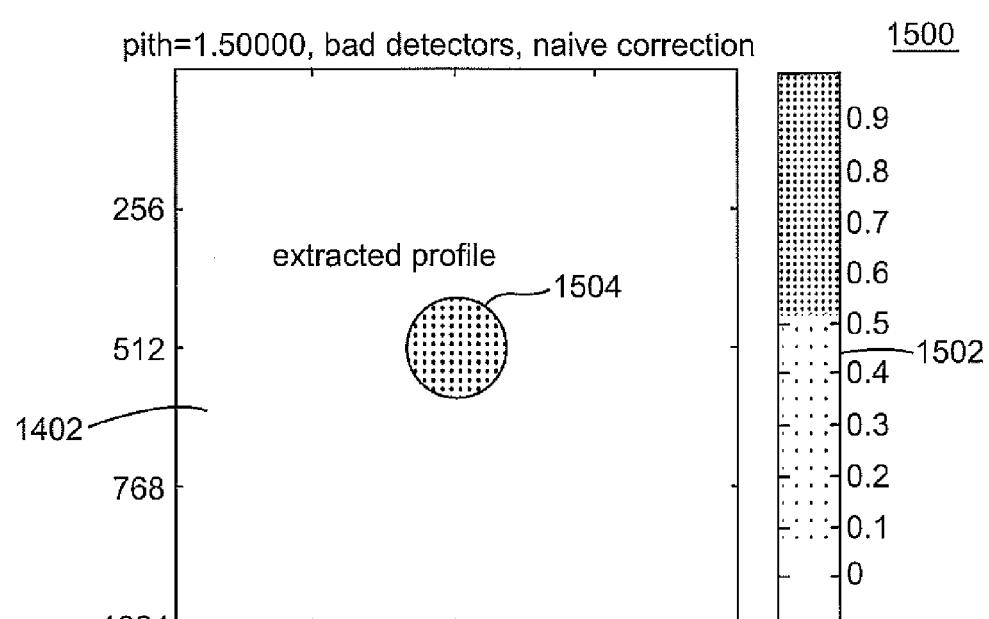
FIG. 15 depicts another exemplary CT image slice at a 1.5000 pitch utilizing signals from some detectors.

FIG. 15 depicts an image 1500 scanned under condition 1108 (i.e., having a pitch of 1.5000, bad sectors, and corrected using naïve correction). The image 1500 contains an extracted profile 1504 viewed at the illustrative resolution 1402 of 1024×1024. A comparison of profile 1406 with profile 1504 shows the disparity between the clarity of profiles 1406 and 1504. When using naïve correction, the resolution of the periphery of profile 1504 is visibly lower than the resolution of the periphery of profile 1406. Image 1500 also includes contrast chart 1502 that shows within an arbitrary scale factor, the numeric meaning of the different shades of grey, which is proportional to the X-ray absorption properties of the material being imaged.

Figure 16:
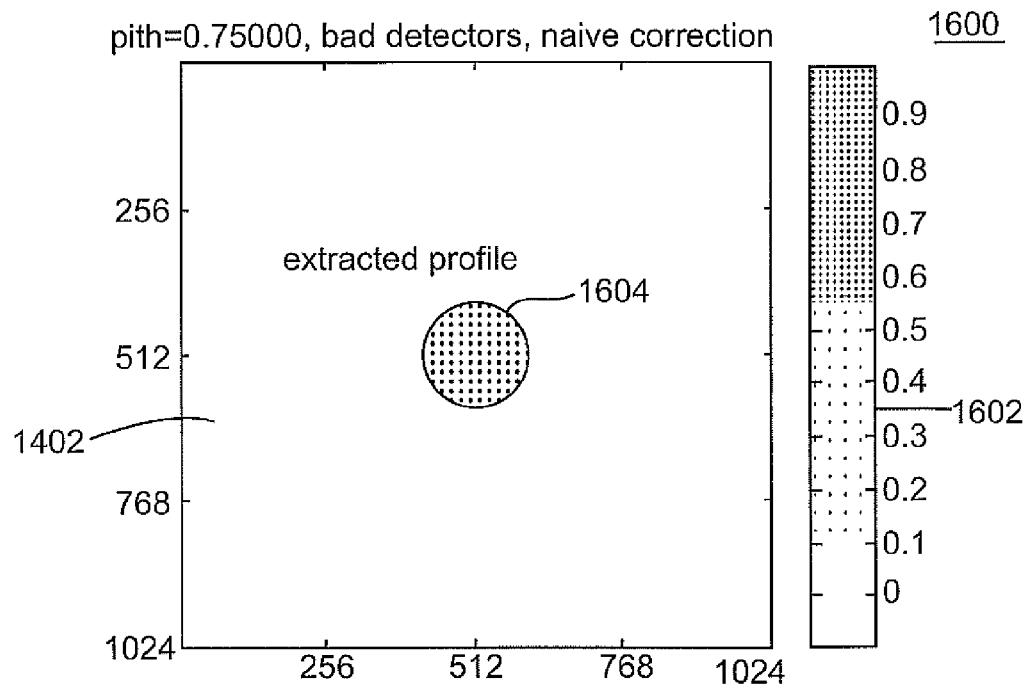
FIG. 16 depicts an exemplary graph 1100 in accordance with aspects of this disclosure.

FIG. 16 depicts an image 1600 scanned under condition 1110 (i.e., having a pitch of 0.7500 and bad sectors). The image 1600 contains an extracted profile 1604 viewed at the illustrative resolution 1402 of 1024×1024. A comparison of profile 1406 with profile 1604 shows the disparity between the clarity of profiles 1406 and 1604. When using naïve correction, the resolution of the periphery of profile 1604 is visibly lower than the resolution of the periphery of profile 1406. Image 1600 also includes contrast chart 1602 that shows within an arbitrary scale factor, the numeric meaning of the different shades of grey, which is proportional to the X-ray absorption properties of the material being imaged.

Figure 17:
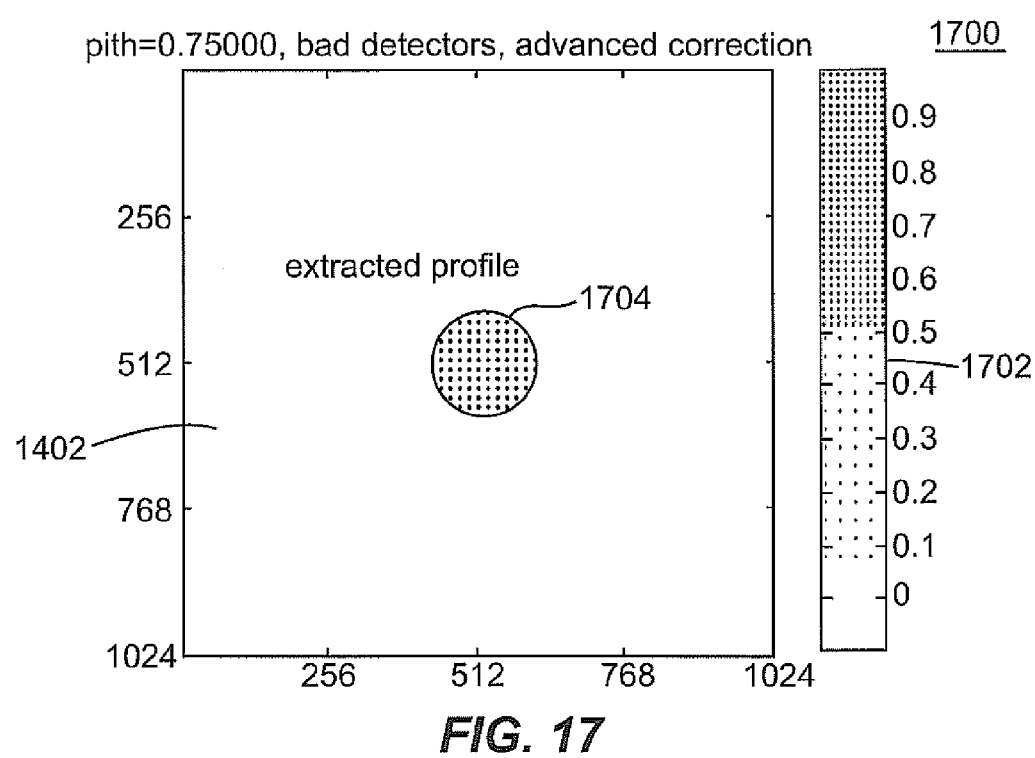
FIG. 17 depicts an exemplary CT image slice in accordance with aspects of the invention at a 1.5000 pitch utilizing signals from some detectors.

In contrast to FIGS. 15 and 16, FIG. 17 depicts an image 1700 scanned under condition 1112 (i.e., having a pitch of 0.7500, bad sectors, and corrected using advanced correction). The image 1700 contains an extracted profile 1704 viewed at the illustrative resolution 1402 of 1024×1024. A comparison of profile 1406 with profile 1704 shows no visible disparity between the clarity of profiles 1406 and 1704. Image 1700 also includes contrast chart 1702 that shows within an arbitrary scale factor, the numeric meaning of the different shades of grey, which is proportional to the X-ray absorption properties of the material being imaged.

Returning to graph 1100 in FIG. 11, the X-axis 1104 spans from 0 to about 2 lines per pixel. The Y-axis 1102 demarks a contrast from about 0 to 1. Note that in graph 1100, condition 1106 is the condition upon which conditions 1108, 1110, and 1112 would ideally replicate. In conditions 1108 and 1110 which both use naïve correction there is a significant drop in contrast at lower resolutions. However, condition 1112, which uses advanced correction to compensate for bad detectors, appears to mimic condition 1106 that has no bad detectors.

Figure 12:
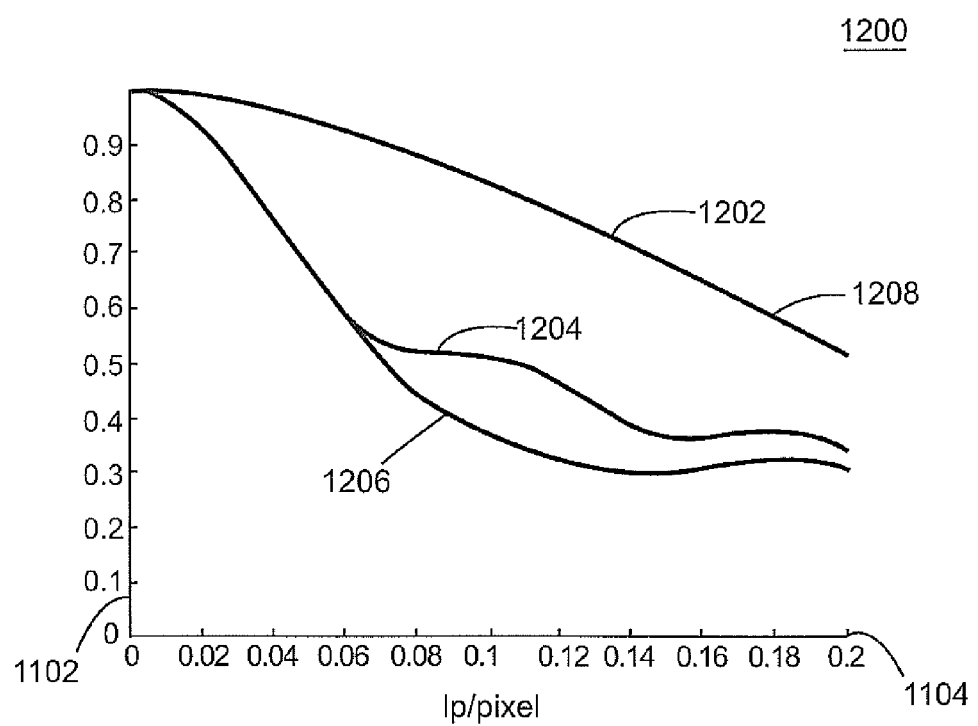
FIG. 12 depicts a close up view of a portion of the exemplary first graph depicted in FIG. 11.

FIG. 12 depicts a close up view of a portion 1200 of the exemplary first graph 1100 depicted in FIG. 11. In portion 1200, the X-axis 1104 spans from 0 to about 0.2 lines per pixel.

Figure 13:
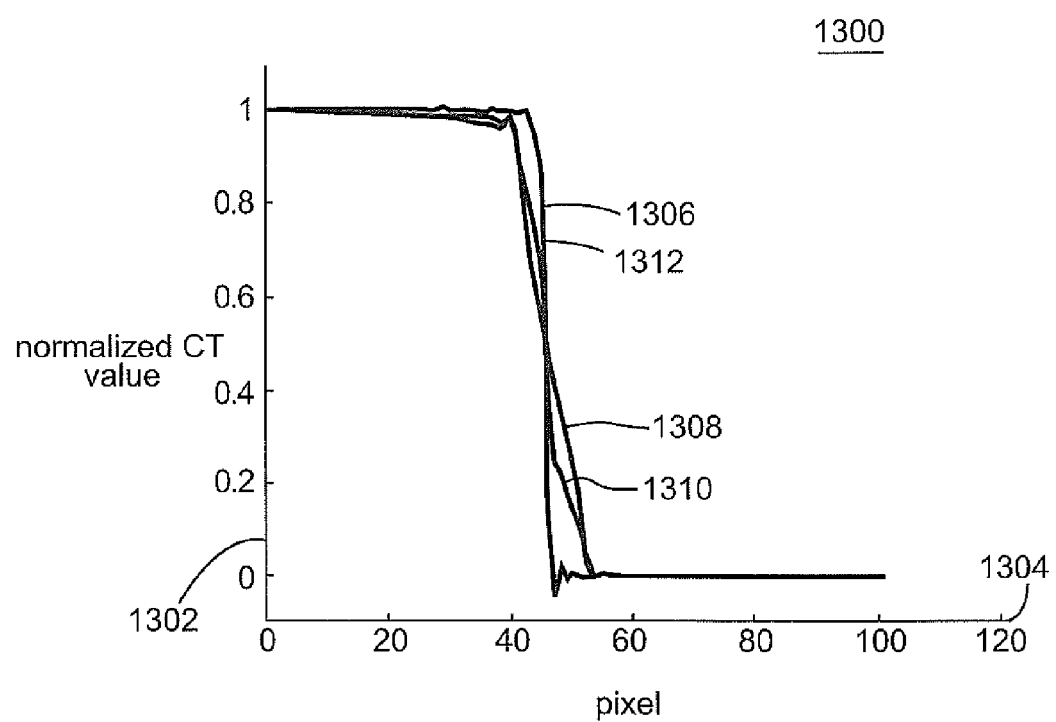
FIG. 13 depicts an exemplary graph of the CT value corresponding with the edge of an object created aspects of this disclosure.

FIG. 13 depicts a graph 1300 of the CT value corresponding with the edge of an object created using first modulation transfer function ("MTF"). The graph 1300 shows the value of the MTF on the "Y" axis 1302 (where perfect contrast corresponds to a value of the MTF of 1) as a function of the special resolution, indicated on the "X" axis 1304 having demarcations to delineate line-pairs per pixel.

To clearly understand the data shown in graph 1300, a reader is encouraged to simultaneously view FIGS. 14-17. The X-axis 1304 represent the pixel number, while the Y-axis 1302 represents the CT value. In an ideal case, a jump from the CT value of 1 to the CT value of 0 would be as stark as possible. Profile 1306 is the profile extracted from FIG. 14, and corresponds to a normal operation state of the scanner. Profile 1308 is the profile extracted from FIG. 15, and corresponds to the scanner operating with bad detectors, and using the naïve correction. Profile 1310 is the profile extracted from FIG. 16, and corresponds to the scanner operating with bad detectors, but running at half the pitch, and using the naïve correction. Profile 1312 is the profile extracted from FIG. 17, and corresponds to the scanner operating with bad detectors, running at half the normal pitch and using the advanced correction. Profile 1312 is practically undistinguishable from profile 1306, while profiles 1308 and 1310 show obvious loss of resolution.

Figure 18:
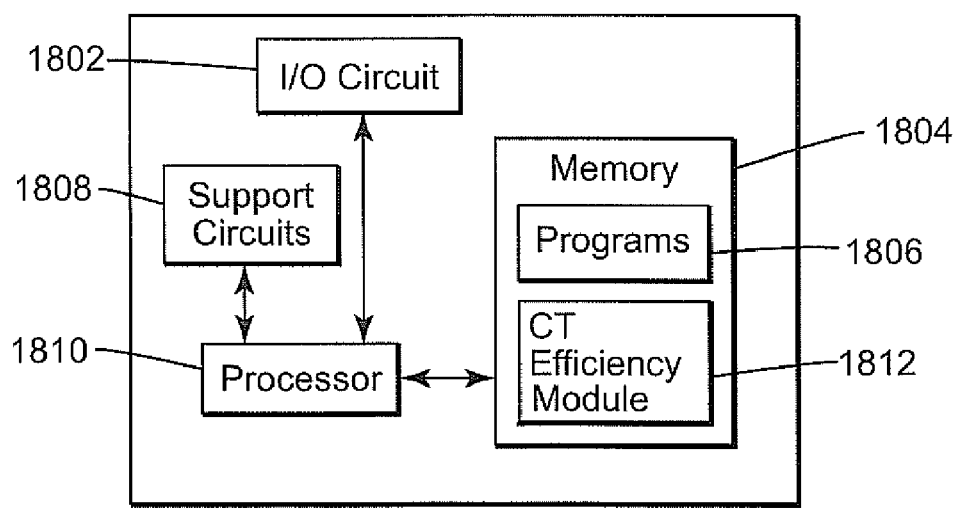
FIG. 18 an embodiment of a high-level block diagram of a computer architecture used in accordance with aspects of the invention.

FIG. 18 depicts a high-level block diagram of a computer architecture for performing an embodiment of the invention. FIG. 18 depicts a general-purpose computer 1800 suitable for use in performing the methods of FIGS. 4-8 and 10; and Equation (1) and Equation (2) described above with respect to FIG. 9.

The general-purpose computer of FIG. 18 includes a processor 1810 as well as a memory 1804 for storing control programs and the like. The processor 1810 cooperates with conventional support circuitry 1808 such as power supplies, clock circuits, cache memory and the like as well as circuits that assist in executing the software routines 1806 and a CT efficiency module 1812 stored in the memory 1804. As such, it is contemplated that some of the process steps discussed herein as software processes may be loaded from a storage device (e.g., an optical drive, floppy drive, disk drive, etc.) and implemented within the memory 1804 and operated by the processor 1810. Thus, various steps and methods of the present invention can be stored on a computer readable medium. The general-purpose computer 1800 also contains input-output circuitry 1802 that forms an interface between the various functional elements communicating with the general-purpose computer 1800. For example, in the embodiment one of FIG. 18, the general-purpose computer 1800 communicates with user interface 322 and/or baggage handling system 324 (shown in FIG. 3). The processor 1810 interprets inputs received from the user interface 322 and/or baggage handling system 324 and, in response thereto; the processor 1810 forwards the instructions these instructions accordingly (e.g., to the detector signal checker 310, the conveyor motor controller 320, and/or the gantry motor controller 308). The processor 1810 uses the information acquired from the detector signal checker 310 to instruct, via the CT efficiency module 1812, the conveyor motor controller 320 to adjust the speed of the conveyor 102 (if needed) and/or adjust the speed of the gantry 104; and reconstruct an image of an item (if an item is present). In addition, the processor 1810, via CT efficiency module 1812, increases the speed of the gantry 104 and the speed of the conveyor 102 for faster scanning as explained above.

Although FIG. 18 depicts a general-purpose computer that is programmed to perform various control functions in accordance with the present invention, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

This written description uses examples to disclose the invention, including the best mode, and also to enable any person skilled in the art to make and use the invention. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

In addition, it is also within the scope of the material disclosed herein that a computer-readable medium having stored thereon a plurality of instructions, the plurality of instructions including instructions which, when executed by a processor, cause the processor to perform the steps as depicted and described above (e.g., in FIGS. 4-8 and 10).

What is claimed is:

1. A method comprising:
    detecting at least one faulty X-ray detector signal in a plurality of X-ray detector signals, wherein each X-ray detector signal in said plurality has a detector associated therewith; and
    adjusting at least one of a conveyor speed and a gantry rotational speed in accordance with said detection.

2. The method of claim 1 wherein said adjusting further comprises:
    calculating at least one of desired conveyor speed and a desired gantry speed in accordance with a detector position for said at least one faulty X-ray detector signal.

3. The method of claim 2 further comprising transmitting said calculation to at least one of a remote baggage handling system, an image reconstruction module, a local user interface, and a conveyor motor controller.

4. The method of claim 1 wherein said adjusting further comprises:
    calculating a difference between a reference conveyor speed and a desired conveyor speed in accordance with a detector position for said at least one faulty X-ray detector signal.

5. The method of claim 1 further comprising:
    performing primary gain scans at a first time;
    storing primary data associated with said primary gain scans at said first time;
    performing secondary gain scans at a second time;
    storing secondary data associated with said secondary gain scans at said second time;
    computing, for each said detector, a relationship between said primary data and said secondary data; and
    flagging said detector as a bad detector when said relationship exceeds a threshold.

6. The method of claim 1 wherein said adjusting of said conveyor speed increases a number of computed tomography ("CT") slices.

7. The method of claim 1 wherein said adjusting of said gantry rotational speed increases a rate at which computed tomography ("CT") slices are acquired.

8. A system comprising:
    a gantry;
    an X-ray emitter configured to emit X-rays within said gantry;

a detector array within said gantry and adapted to detect said X-rays wherein said detector array has a plurality of detectors;
a conveyor configured to move objects through said gantry;
a subsystem configured to check integrity of said plurality of detectors; and
a second subsystem configured to adjust at least one of a speed of said conveyor and a speed of said gantry in accordance with said integrity check to achieve a desired resolution.

* * * * *